United States Patent

Narayanan et al.

[15] 3,668,206
[45] June 6, 1972

[54] HETEROCYCLIC AMINE DERIVATIVES OF 5,8-DIHYDRONAPHTHYLOXY PROPANOLS

[72] Inventors: Venkatachala Lakshmi Narayanan, 703a North Village, North Brunswick; Linda Louise Setescak, R.D. No. 1, Box 121, Cranbury; Frank Lee Weisenborn, 21 Denherder Dr., Somerset, all of N.J.

[22] Filed: Jan. 26, 1970

[21] Appl. No.: 5,993

Related U.S. Application Data

[62] Division of Ser. No. 768,176, Oct. 16, 1968, Pat. No. 3,354,085.

[52] U.S. Cl..................260/268 BC, 260/294.7 M, 424/250
[51] Int. Cl.....................................C07d 51/70, C07d 29/10
[58] Field of Search........................260/268 BC, 294.7 M

[56] References Cited

UNITED STATES PATENTS

| | | | |
|---|---|---|---|
| 2,681,932 | 6/1954 | Dornfeld | 260/268 |
| 3,340,266 | 9/1967 | Howe et al. | 260/288 |
| 3,341,537 | 9/1967 | Richardson | 260/247.2 |
| 3,395,146 | 7/1968 | Satzinaer | 260/268 |
| 3,476,767 | 11/1969 | Bencze | 260/268 |
| 3,501,769 | 3/1970 | Crowther | 260/570.8 R |
| 3,051,709 | 8/1962 | Shapiro et al. | 260/268 |
| 3,085,938 | 4/1963 | Berger | 260/247.2 |
| 3,097,243 | 7/1963 | Cutler | 260/247.2 X |
| 3,534,085 | 10/1970 | Narayanan et al. | 260/268 X |

FOREIGN PATENTS OR APPLICATIONS

| | | | |
|---|---|---|---|
| 1,013,224 | 12/1965 | Great Britain | 260/288 |
| 1,047,927 | 11/1966 | Great Britain | 260/288 |

*Primary Examiner*—Donald G. Daus
*Attorney*—Lawrence S. Levinson, Merle J. Smith and Donald J. Perrella

[57] ABSTRACT

This invention relates to new 5,8-dihydronaphthyloxy-aminopropanols and related compounds of the formula

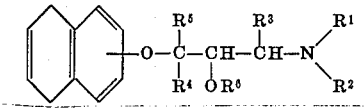

wherein

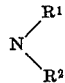

are piperidino and other heterocyclic derivatives and to salts of such compounds, products which are useful in coronary diseases, water softening and corosion inhibition.

9 Claims, No Drawings

HETEROCYCLIC AMINE DERIVATIVES OF 5,8-DIHYDRONAPHTHYLOXY PROPANOLS

This application is a division of application Ser. No. 768,176, filed Oct. 16, 1968, now U.S. Pat. No. 3,354,085 issued Oct. 13, 1970.

SUMMARY OF THE INVENTION

This invention relates to new chemical compounds of the formula

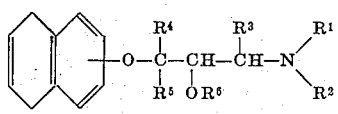

wherein the radical

is a basic nitrogen containing radical of up to about 18 atoms,
$R^3$, $R^4$ and $R^5$ each is hydrogen or lower alkyl,
$R^6$ is hydrogen or the acyl radical of a hydrocarbon carboxylic acid of less than 14 carbon atoms,
and salts of those compounds.

DETAILED DESCRIPTION OF THE INVENTION

In formula I, the lower alkyl groups represented by the various symbols include straight and branched chain saturated hydrocarbon groups such as methyl, ethyl, propyl, isopropyl, butyl, isobutyl, t-butyl, amyl and the like. The phenyl-lower alkyl groups, also referred to below, include similar alkyl groups, e.g., benzyl, phenethyl and the like.

The acyl radicals represented by $R^6$ include lower fatty acid radicals such as acetyl, propionyl, butyryl, isobutyryl and the like, as well as long chain fatty acid radicals such as hexanoyl, heptanoyl, decanoyl, dodecanoyl and the like, aryl and aralkanoic acid radicals such as benzoyl, phenacetyl and the like.

In the basic nitrogen containing radical (II) 

in formula I, $R^1$ and $R^2$ each represents hydrogen, lower alkyl, lower alkenyl, hydroxy lower alkyl and phenyl lower alkyl forming such basic groups as amino, lower alkylamino, e.g., methylamino, ethylamino, isopropylamino, di(lower alkyl)amino, e.g., dimethylamino, diethylamino, dipropylamino, lower alkenylamino, e.g., allylamino, di(lower alkenyl)amino, e.g., diallylamino, (hydroxy lower alkyl)amino, e.g., hydroxyethylamino, di(hydroxy lower alkyl)amino, e.g., di(hydroxyethyl)amino, phenyl(lower alkyl)amino, e.g., benzylamino, phenethylamino, N-(lower alkyl)phenyl(lower alkyl)amino, e.g., N-methylbenzylamino, and the like.

In addition the nitrogen may join with the groups represented by $R^1$ and $R^2$ to form a five to seven membered monocyclic heterocyclic containing, if desired, an oxygen, sulfur or an additional nitrogen atom, (not more than two hetero atoms altogether). The heterocyclic group may also be substituted by one or two groups lower alkyl, lower alkoxy, hydroxy lower alkyl or alkanoyloxy lower alkyl (the alkanoyl moiety being similar to those already described).

Thus heterocyclic groups represented by the radical II include for example, piperidino,di(lower alkyl)piperidino,e.g., 2,3-dimethylpiperidino,2-,3- or 4-(lower alkoxy)piperidino,e.g., 2-methoxypiperidino,2-, 3- or 4-(lower alkyl)piperidino,e.g., 2-, 3- or 4-methylpiperidino,N-methylpiperidino,pyrrolidino, (lower alkyl)pyrrolidino,e.g., 2-methylpyrrolidino,di(lower alkyl)pyrrolidino,e.g., 2,3-dimethylpyrrolidino,(lower alkoxy)-pyrrolidino,e.g., 2-ethoxypyrrolidino,N-lower alkylpyrrolidino, e.g., N-methylpyrrolidino, morpholino, (lower alkyl)morpholino, e.g., N-methylmorpholino, or 2-methylmorpholino, di(lower alkyl)morpholino, e.g., 2,3-dimethylmorpholino, (lower alkoxy)-morpholino, e.g., 2-ethoxymorpholino, thiamorpholino, (lower alkyl)thiamorpholino, e.g., N-methylthiamorpholino or 2-methylthiamorpholino, di(lower alkyl)thiamorpholino, e.g., 2,3-diethylthiamorpholino, 2,3-dimethylthiamorpholino, (lower alkoxy)thiamorpholino, e.g., 2-methoxythiamorpholino, piperazino, (lower alkyl)piperazino, e.g., 4-methylpiperazino, 2-methylpiperazino, (hydroxy-lower alkyl)piperazino, e.g., 4-(2-hydroxyethyl)piperazino, di(lower alkyl)piperazino, e.g., 2,3-dimethylpiperazino, alkanoyloxy(lower alkyl)piperazino, e.g., $N^4$-(2-dodecanoyloxyethyl)piperazino, hexamethyleneimino and homopiperazino.

In the foregoing radicals, the lower alkyl and lower alkoxy groups include straight and branched chain groups such as methyl, ethyl,propyl, isopropyl, butyl, isobutyl, t-butyl, methoxy, ethoxy, isopropoxy, butoxy, respectively. The lower alkenyl groups are similar monounsaturated groups.

The compounds of formula I form acid addition salts with inorganic and organic acids. These acid addition salts frequently provide useful means for isolating the products from reaction mixtures by forming the salt in a medium in which it is insoluble. The free base may then be obtained by neutralization, e.g., with a base such as sodium hydroxide. Then any other salt may again be formed from the free base and the appropriate inorganic or organic acid. Illustrative are the hydrohalides, especially the hydrochloride and hydrobromide which are preferred, sulfate, nitrate, phosphate, borate, acetate, oxalate, tartrate, maleate, citrate, succinate, benzoate, ascorbate, salicylate, methanesulfonate, benzenesulfonate, toluenesulfonate and the like. Quaternary ammonium salts are also formed, e.g., by reacting the free base with an alkylating agent, e.g., lower alkyl halide such as methyl chloride, ethyl bromide or the like, lower alkyl sulfate such as methyl sulfate, aralkyl halides such as benzyl chloride, aralkyl sulfates such as benzyl sulfate and the like.

Preferred are those compounds wherein $R^3$, $R^4$, $R^5$ and $R^6$ are all hydrogen, $R^1$ is hydrogen or lower alkyl, especially hydrogen, and $R^2$ is lower alkyl, especially isopropyl, particularly when the side chain is attached to the 1-position of the fused ring.

The new compounds of this invention are useful as water softeners and for inhibiting the corrosivity of the engine lubricants.

They are also useful as antifibrillatory agents, for example, in arresting cardiac arrhythmia in animals, e.g., by inhibition of beta adrenergic receptors in the myocardium. For this purpose a compound of formula I or a physiologically acceptable acid addition salt may be incorporated in a conventional dosage form such as tablet, capsule, elixir, injectable or the like along with the necessary carrier material, excipient, lubricant, buffer or the like. Single or divided doses of about 5 to 25 mg/kg/day, preferably about 4 to 10 mg/kg, two to four times daily may be administered in dosage forms as described above.

The products of formula I may be produced by either of two methods described below. The symbols have the same meanings defined previously.

According to the preferred method, a naphthol of the formula (III) 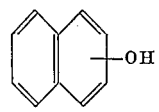

is reduced with a metal like sodium or lithium in liquid ammonia containing an alcohol such as ethanol, isopropanol, t-butanol or the like [e.g., by the procedure described in Organic Synthesis, Coll. Vol. 4, page 887 (1963)] to obtain the 5,8-dihydronaphthol of the formula (IV) 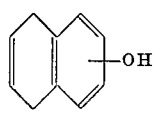

The compound of formula IV is made to react with an epoxide of the formula (V) 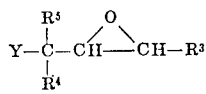

(Y is chlorine or bromine), to obtain a product of the formula (VI) 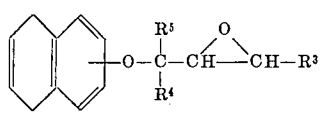

By refluxing the compound of formula VI with an amine of the formula (VII) 

in an inert organic solvent such as n-propanol, benzene or toluene, e.g., for about 16 to 24 hours, yields a product of formula I wherein $R^6$ is hydrogen. An alternate procedure involves heating the reactants in a Paar pressure reactor at a temperature of about 70° – 110° for 6 – 12 hours. The ester, i.e., wherein $R^6$ is acyl, is obtained by esterifying the product of the foregoing procedure with the appropriate hydrocarbon carboxylic acid, e.g., by refluxing the alcohol (formula I wherein $R^6$ = H) with the appropriate acid in a solvent like methylene or ethylene chloride using a trace of sulfuric, aryl sulfonic acid or borontrifluoride as catalyst. In an alternate procedure, the alcohol is heated with the appropriate acid chloride or acid anhydride (obtained from the appropriate hydrocarbon carboxylic acid) in the presence of anhydrous pyridine or sodium acetate. Examples of such acids include acetic acid, propionic acid, butyric acid, isobutyric acid, hexanoic acid, decanoic acid, benzoic acid, phenylacetic acid, etc. The acid addition salts and quaternary ammonium salts may be formed as previously described.

As an alternate method, an amine of formula VII is reacted with a compound of the formula (VIII) 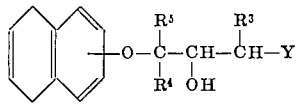

(Y is halogen, preferably bromine), e.g., by refluxing two equivalents of the amine of formula VII with one equivalent of of VIII in an organic solvent such as chloroform, benzene, toluene or dimethoxyethane for about 6 to 10 hours.

The compounds of formula VIII are prepared by reacting compounds of formula VI with a hydrohalic acid, for example, hydrobromic acid.

The following examples are illustrative of the invention. All temperatures are on the centigrade scale.

EXAMPLE 1

1-(5,8-Dihydro-1-naphthyloxy)-3-(isopropylamino)-2-propanol a. 5,8-dihydro-1-naphthol A 3-liter three necked flask, equipped with a Dry Ice condenser, a sealed Hershberg-type stirrer, and an inlet tube, is set up in a hood and charged with 108 g. (0.75 mole) of α-naphthol. The stirrer is started, and to the rapidly stirred flask contents is added 1 liter of liquid ammonia as rapidly as possible (about 5 minutes). When the naphthol has gone into solution (about 10 minutes), 20.8 g. (3.0 g. atoms) of lithium metal is added in small pieces and at such a rate as to prevent the ammonia from refluxing too violently. After the addition of the lithium has been completed (about 45 minutes), the solution is stirred for an additional 20 minutes and is then treated with 170 ml. (3.0 moles) of absolute ethanol which is added dropwise over a period of 30–45 minutes. The condenser is removed, stirring is continued, and the ammonia is evaporated in a stream of air introduced through the inlet tube. The residue is dissolved in 1 liter of water, and, after the solution has been extracted with two 100 ml. portions of ether, it is carefully acidified with concentrated hydrochloric acid. The product formed is taken into ether with three 250 ml. extractions, and then the ether extract is washed with water and dried over anhydrous sodium sulfate. The ether is removed by evaporation to yield 106 – 108 g. (97–99 percent) of crude 5,8-dihydro-1-naphthol, m.p. 69°–72°. This material is dissolved in benzene, treated with charcoal, the solvent is evaporated, and the residue crystallized from hexane to give pure 5,8-dihydro-1-naphthol, m.p. 70.5° – 72°.

b. 1-(2,3-epoxypropoxy)-5,8-dihydronaphthalene

To a cooled solution of 15 g. (0.1 m.) of 5,8-dihydro-1-naphthol and 13.2 g. (0.14 m.) of epichlorohydrin in 38 ml. of p-dioxane, a cold solution of 4.9 g. of sodium hydroxide in 10 ml. of water is added dropwise. The mixture is refluxed 3 hours, cooled, and extracted with benzene. The benzene extract is washed with water, dried (MgSO$_4$) and evaporated in vacuo to give 1-(2,3-epoxypropoxy)-5,8-dihydronaphthalene. Distillation of the crude oil at 1.2 mm., b.p. 139-140°, gives a colorless liquid;

$\lambda$ max. film 1250, 910, 840 cm$^{-1}$ (characteristic epoxy bands),
 liq.

CDCl$_3$ 4.13

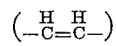

2.5-3.5 (aromatic protons).

c. 1-(5,8-dihydro-1-naphthyloxy)-3-(isopropylamino)-2-propanol

A mixture of 4.4 g. (0.02 m.) of the product of part (b) and 16 g. (0.27 m.) of isopropylamine is placed in a small Parr pressure reactor and heated in an oil bath (bath temp. 80°–86° — pressure gauge registered 50 psi) for 10 hours. After standing overnight excess isopropylamine is evaporated in vacuo to give 1-(5,8-dihydro-1-naphthyloxy)-3-(isopropylamino)-2-propanol as a crude yellow solid. Recrystallization from ether gives white needles, m.p. 85°–88°.

EXAMPLE 2

1-(5,8-Dihydro-1-naphthyloxy)-3-isopropylamino-2-propyl acetate

A mixture of 3 g. of 1-(5,8-dihydro-1-naphthyloxy)-2-isopropylamino-2-propanol, 1.5 g. of fused acetate and 15 ml. of acetic anhydride is heated on a steam bath with occasional shaking for 1 hour. At the end of this time, the warm solution is poured with vigorous stirring into 100 ml. of ice water. The mixture is stirred for 10–15 minutes and the crystals of 1-(5,8-dihydro-1-naphthyloxy)-3-isopropylamino-2-propyl acetate are collected, washed thoroughly with water, and purified by crystallization from alcohol.

EXAMPLE 3

By substituting β-naphthol for the α-naphthol in part (a) in Example 1, 1-(5,8-dihydro-2-naphthyloxy)-3-(isopropylamino)-2-propanol is obtained.

In addition by following the procedure of Example 1, utilizing the α-or β-naphthol indicated below in part (a) and substituting the amine indicated below for the isopropyl amine in part (c), there is obtained the corresponding 1-(5,8-dihydro-1 (or 2)-naphthyloxy-3-substituted amino)-2-propanol having the group corresponding to the amine listed:

| Example | naphthol | amine |
|---|---|---|
| 4 | α-naphthol | piperidine |
| 5 | β-naphthol | piperidine |
| 6 | α-naphthol | 2,3-dimethylpiperidine |
| 7 | α-naphthol | 4-methylpiperidine |
| 8 | α-naphthol | 2-methylpyrrolidine |
| 9 | α-naphthol | morpholine |
| 10 | α-naphthol | N-methylmorpholine |
| 11 | β-naphthol | thiamorpholine |
| 12 | α-naphthol | 2,3-diethylthiamorpholine |
| 13 | α-naphthol | piperazine |
| 14 | α-naphthol | 2-methylpiperazine |
| 15 | α-naphthol | 4-(hydroxyethyl)piperazine |
| 16 | α-naphthol | 2,3-dimethylpiperazine |
| 17 | α-naphthol | $N^4$-(2-dodecanoyloxyethyl)piperazine |
| 18 | α-naphthol | homopiperazine |

By esterifying each of the foregoing products with acetic acid, propionic acid, decanoic acid and phenylacetic acid, respectively, as described in Example 2, the acetate, propionate, decanoate and phenylacetate of each is obtained.

EXAMPLE 19

2-(5,8-dihydro-1-naphthyloxy)-2-methyl-4-(1-piperazinyl)-3-pentanol

By following the procedure of Example 1, but substituting 2-(5,8-dihydro-1-naphthyloxy)-2-methyl-(3,4-epoxy)pentane for the epichlorohydrin in part (b) and substituting piperazine for the isopropylamine in part (c), 2-(5,8-dihydro-1-naphthyloxy)-2-methyl-4-(1-piperazinyl)-3-pentanol is obtained.

What is claimed is:

1. A compound of the formula

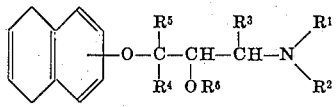

wherein

form a member of the group consisting of piperidino, di(lower alkyl)piperidino, (lower alkoxy)piperidino, (lower alkyl)-piperidino, piperazino, (lower alkyl)-piperazino, $N^4$-(hydroxy-lower alkyl)-piperazino, di(lower alkyl)piperazino and $N^4$-($C_1$-$C_{14}$-alkanoyloxy lower alkyl)-piperazino, $R^3$, $R^4$ and $R^5$ each is hydrogen or lower alkyl and $R^6$ is hydrogen, acetyl, propionyl, decanoyl or phenyl-acetyl and wherein lower alkyl or alkoxy is one to six carbon atoms, and salts of said compound.

2. A compound as in claim 1 wherein $R^3$, $R^4$, $R^5$, $R^6$ each is hydrogen.

3. A compound as in claim 2 wherein the ring attachment is in the 1-position.

4. A compound as in claim 3 wherein

is 4-methyl piperidino.

5. A compound as in claim 3 wherein the

is piperazino.

6. A compound as in claim 3 wherein the

is 4-methylpiperazino.

7. A compound as in claim 3 wherein the

is piperidino.

8. A compound as in claim 3 wherein the

is 4-(hydroxyethyl)piperazino.

9. A compound as in claim 3 wherein the

is $N^4$-(2-dodecanoyloxyethyl)piperazino.

* * * * *